May 12, 1964 MASAO INABA 3,133,149

DERIVATION OF SUB-CARRIER OSCILLATOR CONTROL VOLTAGE FROM SYNCHRONOUS DETECTORS

Filed Nov. 8, 1960

INVENTOR.
M. INABA

BY Greene, Pineles & Durr

ATTORNEYS 3,133,149

DERIVATION OF SUB-CARRIER OSCILLATOR CONTROL VOLTAGE FROM SYNCHRONOUS DETECTORS

Masao Inaba, Tokyo, Japan, assignor to Nippon Electric Company, Limited, Tokyo, Japan, a corporation of Japan Filed Nov. 8, 1960, Ser. No. 68,076
Claims priority, application Japan Nov. 13, 1959
3 Claims. (Cl. 178—5.4)

This invention relates to color television receiver synchronizing circuits. The synchronizing circuits of the invention relate to the type of circuits described in the article by Donald Ridsman entitled "Color-Carrier Reference Phase Synchronization Accuracy," in NTSC, "Color Television," published in the Proceedings of the Institute of Radio Engineers, volume 42, No. 1, of January 1954, pages 106–133, and in other prior publications, and reference is herein made to the disclosure of these prior publications for simplifying the explanation of the present invention.

The primary object of this invention is to provide an improved color synchronization system that is stable and which provides accurate color images without frequent adjustment of the control knob. The invention is applicable to conventional NTSC color systems and to other types as well.

Installed on the outside of the cabinet of NTSC type color television receivers, there are two adjusting devices or controls other than those for black and white television receivers. Such adjustments are the so-called saturation or color control, and the hue or tint control. Accurate alignment of the hue control is performed with a standard color pattern, and is extremely difficult to regulate through any general color image occurring during television reception. It is therefore desirable for NTSC type color receivers to provide hue control by automatic means with accurate standard conditions about which a variable range is given, or alternatively, to remove the hue control knob from the receiver. Color monitors used at the transmitter station particularly, could use such automatic circuit.

This invention provides a hue control circuit of such nature as to be automatic, the standard condition being the predetermined normal color reproduction.

The basic idea is to detect stably from the color demodulator for a color sub-carrier signal the phase difference between a color burst signal applied simultaneously with a chrominance signal to said color demodulator, and a reference signal for providing a demodulation phase, in order to perform phase synchronisation of the sub-carrier oscillator for demodulation. Color synchronisation systems are disclosed by the prior art but the subject invention intends to provide a more improved method which is immune to the D.C. level of the oscillator input stage.

The foregoing and other objects of the invention will be best understood from the following description of an exemplification thereof, reference being had to the accompanying drawing, wherein.

Figure 1:
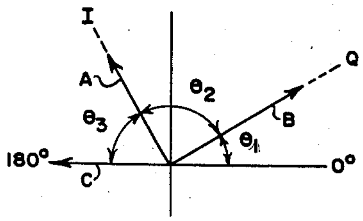
FIG. 1 is a color sub-carrier vector diagram showing demodulating components of the chrominance signal for NTSC type color television receivers.

The chrominance or color sub-carrier vector diagram of the color demodulation signal axis of NTSC type color television receivers is represented in a conventional manner in FIG. 1. Vector A represents the demodulated phase and the amplitude of the first chrominance or color signal; and vector B, those of the receiver's second color signal. Vector C represents the color synchronization signal as provided by the NTSC signal standard, and generally represented at the −180° phase position in rectangular coordinates, as shown. Vector A and vector B being chosen respectively on axis I and axis Q according to NTSC signal standards, it is known that, $$\theta_1=33°;\ \theta_2=90°;\ \theta_3=57°$$

With the receiver color signals A and B and the color synchronization signal C thus related to the I—Q demodulation components, then, during the horizontal blanking period of the I demodulator output signal, the demodulation is arranged to produce a pulse proportional to cos $\theta_3$. On the other hand, during the output signal of the Q demodulator, a pulse proportion to −cos $\theta_1$ is produced. Consequently, if these pulses obtained by the I and Q demodulators are respectively multiplied by the coefficient cos $\theta_3$ and the coefficient −cos $\theta_1$, and then superimposed with the signal C, they cancel each other exactly, as will be set forth hereinafter. These cosine ratios are of the angles which the I and Q signals have, by design, with the signal C (see FIG. 1).

Figure 2:
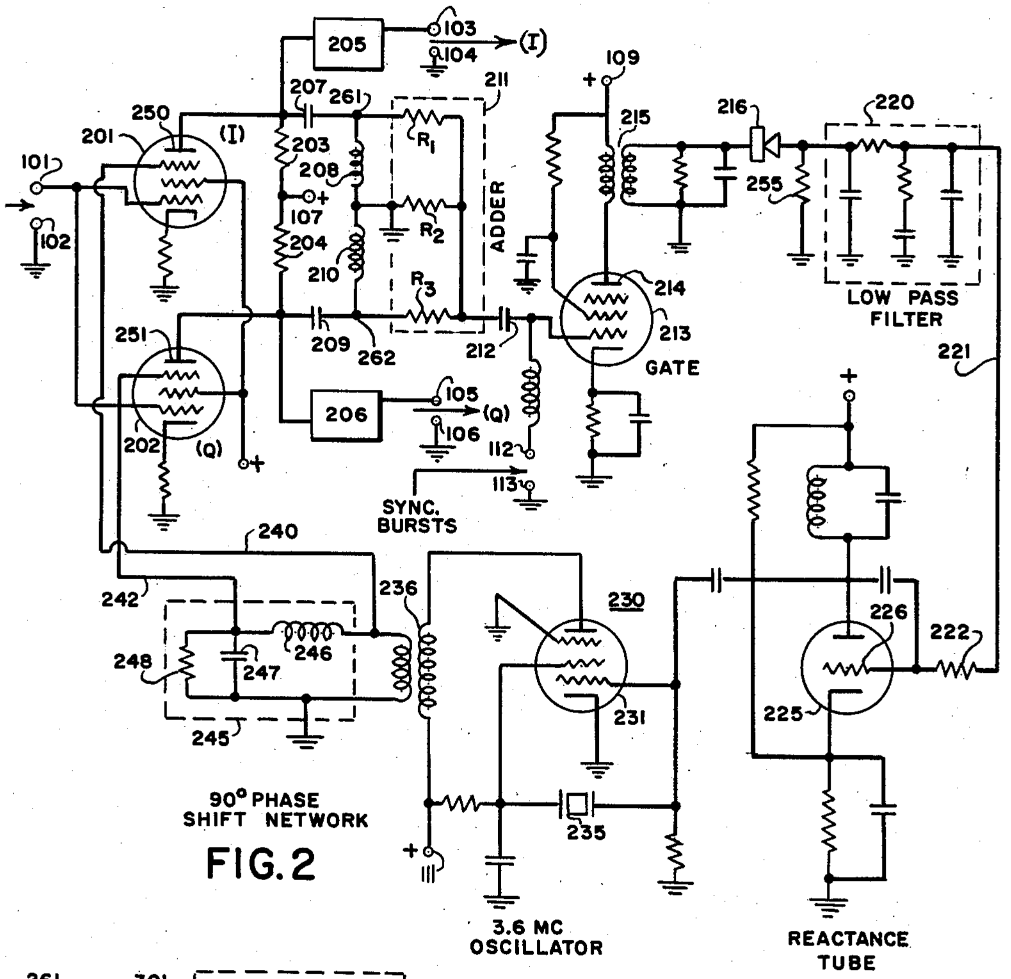
FIG. 2 is a circuit diagram of the color reproduction circuit of the receiver embodying features of the present invention.

When the I and Q demodulators are kept at a 90° phase difference and move into a leading phase from the normal phase, then the above cancelling relation or balance is broken, and some positive pulses will remain. Correspondingly, for a lagging case, some negative pulses will remain. A sine function prevails for the phase relation and the superimposed pulses. A novel, accurate color synchronization system is herein obtained by passing the above pulses through a low-pass filter, and by using them as a reactance control voltage of the usual automatic phase control (APC) system color synchronization circuit. FIG. 2 shows a part of the color-reproducing circuit of an NTSC type color receiver to which this inventive principle is applied.

Referring now to the exemplary circuit of FIG. 2, terminals 101 and 102 comprise the input for the color signals including the color burst (synchronization) signal of the receiver. The first and second synchronous demodulators are 201 and 202, respectively. In this description the I demodulator is 201, and the Q demodulator is 202, respectively. Resistors 203 and 204 are load resistors for demodulators 201 and 202, respectively. The anode potential supply for tubes 201 and 202 is at the terminal 107. A low-pass filter 205 is designed for passing only the demodulated output of the signal voltages produced in the resistor 203, providing the desired I-demodulated output (e.g. at 0–1.6 mc.) at terminals 103, 104. Another low-pass filter 206 and output terminals 105, 106 provide the Q channel signal (e.g. at 0–0.6 mc.). Reference is made to Terman, "Electronic and Radio Engineering," published by McGraw-Hill Company, 1955, FIGS. 25–26, for a typical NTSC type of color television circuit.

Condensers 207, 209 block D.C., and are designed, together with inductances 208, 210, to pass the sub-carrier or frequency component at 3.6 mc. The resistor network $R_1$, $R_2$, $R_3$ enclosed by dotted rectangle 211, is an adder circuit or matrix in which the above-referred-to coefficients −cos $\theta_1$ and cos $\theta_3$ are superimposed on the signals. The adder output is coupled by condenser 212 to gate tube 213 that receives the pulse for gating the color burst signal applied at terminals 112, 113. The gated, 3.6 mc. color sub-carrier bursts passed through condenser 212, are of the color synchronization signal pedestal, and provided an output thereof to the tank circuit 215 at the plate 214. The anode 214 potential supply is at 109. The tuned tank 215 is connected to a detector 216. A low-pass filter 220 determines the control condition of the color bursts. A reactance tube 225 has its control electrode 226 connected to the output of filter 220 through lead 221 and coupling resistor 222. Reactance tube 225 is connected to serve as a load capacitance of a crystal oscillator 230. Crystal controlled oscillator 230 comprises an oscillator tube 231 the output signals of which are fed to the suppressor grid of the I-demodulator tube 201, through a first take-off lead 240, and to the suppressor grid of the Q-demodulator tube 202 through a second take-off lead 242. Leads 240 and 242 are connected across a 90° phase shifting circuit 245. The local oscillator 230 includes a crystal 235, and both are designed for close tolerance to the selected sub-carrier frequency, as 3.6 mc.

The subcarrier frequency generation is controlled as to its synchronism to be in phase and identical frequency with that at the transmitter through the circuitry of the invention, as requisite for the I and Q demodulation, by synchronous detectors 201, 202. The transformer 236 couples the local oscillator 230 to 90° phase shifting circuit 245. Terminal 111 provides the anode potential to the plate of the oscillator tube 231. The phase-shifting network 245 comprises an inductor 246, condenser 247 and shunt resistor 248 proportioned to provide the 90° phase difference for take-off leads 240, 242 at the subcarrier frequency (3.6 mc.).

The invention circuit performs in the following manner: In the plates 250, 251 of the respective I and Q demodulators 201, 202 (FIG. 2) appear (i) a signal which is the amplitude product or superposition of the vectors A and C, (ii) a signal which is the superposition of the vector B and C; (iii) the demodulated I signal; (iv) the demodulated Q signal; and others. As stated above, suitable selection of the capacitance values for blocking condensers 207 and 209 and the inductance values for coils 208 and 210, results in vector $A \times B$, and the vectors $B \times C$ (see FIG. 1) being filtered out thereby. These filtered-out signals (band-passed) are modified by the referred-to coefficients or ratios in adding circuit 211. In order to take out only the requisite signals, gate valve 213 duly selects and amplifies only during the time period in which the color burst synchronization signal occurs.

Three kinds of superimposed signals are detected by the detector 216. Let $\underline{A}$, $\underline{B}$ and $\underline{C}$ be the amplitudes of the vectors A, B and C, respectively. Then the output signal of the detector 216 at its output resistor 255 is proportional to:

$$\underline{AB}\cos\theta_2+\underline{A}\cos\theta_3+\underline{BC}\cos(\theta_2+\theta_3) = \underline{AC}\cos\theta_3-\underline{BC}\cos\theta_1 \qquad (1)$$

As $\underline{AC}$ and $\underline{BC}$ are multiplied by the above-stated ratios through adding circuit 211, the above equation has its right side result in zero, and no output signal appears at detector 216 across its load resistor 255. When, on the other hand, the phase of the local oscillator 230 is lagging, then, $$\underline{AC}\cos\theta_3<\underline{BC}\cos\theta_1 \qquad (2)$$

and a negative D.C. voltage appears at the detector 216 output across resistor 255. This negative D.C. voltage is arranged to operate in the direction to reduce the capacitance of the reactance tube 225. Consequently, stability is directly obtained as the phase of the local oscillator 230 is advanced thereby, and becomes normal. On the other hand, when the phase of the local oscillator 230 is ahead, then, $$AC\cos\theta_3>BC\cos\theta_1 \qquad (3)$$

and a positive D.C. voltage appears across resistor 255. The result is a positive D.C. signal applied to reactance tube 225 that functions in the direction to retard the phase of the oscillator 230, and stability is thereby obtained when the phase is thus corrected.

Figure 3:
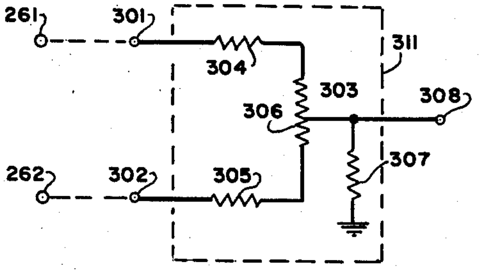
FIG. 3 is a circuit diagram of a modification of a section of the circuit of FIG. 2.

FIG. 3 illustrates a modification 311 of the adding circuit 211 of the color receiver circuit of FIG. 2. Adder 311 may be applied in FIG. 2 for effectively changing the color phase of both synchronous demodulators 201, 202 by a reasonable extent. The normal phase is at the center with respect to both the leading or lagging direction of the signals at the blocking condensers 207 and 209 (FIG. 2). The terminal 261 at condenser 207 is connected to terminal 301 of adder 311; and terminal 262 at condenser 209, to terminal 302.

The function of the multiplying factors and superimposing, as stated hereinabove, is realized by the arrangement of resistor 304, the upper half of potentiometer 306, and a shunt resistance 307 from tap 303 to ground; and the arrangement of resistor 305, the lower half of potentiometer 306 and the shunt resistor 307. The movable contact or tap 303 of the variable resistor 306 is placed in the middle of the movable range. Terminal 308 of adder 311 is its output, and is connected to the blocking condenser 212 (FIG. 2). Changing the tap 303 position on variable resistor 306 permits the normal balance in the color synchronization system to be broken, and permits the circuit to then automatically re-balance such unbalance to make the system become stable at a phase different from the normal transmitted one. The variable resistor 306 thus performs the function of color phase controller. However, when tap 303 of the variable resistor 306 is set in the middle of its variable range, color reproduction in the normal color phase is performed accurately.

The conventional color synchronization circuit as generally used in color television receivers is composed of the color signal amplifying section ahead of the demodulator section (201, 202) and the gate 213. The amplifying circuit and the phase discriminator are arranged therein to handle the color burst signals for color synchronization by entirely independent channels. Furthermore, due to the nature of its color synchronization circuitry, it is arranged with a circuit characteristic of only a comparatively narrow band. A change of source voltage or the receiver ambient temperature is very likely to cause a phase error. However, in color synchronization systems embodying the features of the present invention, the phase error is detected directly from the output of the color demodulator (201, 202), and the error is directly compensated for, including phase error due even to a circuit fault. Therefore, receiver operation at an erroneous phase is eliminated by the system of the present invention.

From the foregoing description, it can readily be understood that the color synchronisation can be performed completely independent of the stability of the D.C. operating points of the gating and other circuits according to the present invention, whereas a problem such that changes in the center of the D.C. operation of the gating circuit appear as phase errors in synchronism occur in prior art devices.

Although the present invention has been set forth in conjunction with specific embodiments and system applications, it is understood to be applicable not only to color television receivers employing the I—Q axis demodulation system, but also, for example, to the $R-Y$, $B-Y$, the $X-Z$, and other types of color television receivers. Further, color monitors and similar equipment used at the broadcast end for the purpose of monitoring signals, require continued maintenance of color reproduction with accurate signal phase, which requirement is fulfilled by the system of the present invention. It will therefore be apparent to those skilled in the art that the novel principles of the invention disclosed herein in connection with specific exemplifications thereof, will suggest various other modifications and applications of the same. It is accordingly desired that in construing the breadth of the appended claims, they shall not be limited to the specific exemplifications of the invention described above.

I claim:

1. In a synchronizing system for color television receivers utilizing color signals: A first and second demodulator stage selectively responsive to two different received color signals, a local oscillator proportioned to generate signals at a synchronous subcarrier frequency, means including circuit connections from said oscillator to said first and second demodulator stages to provide subcarrier frequency signals thereto to effect the demodulation of received color signals, an adder circuit coupled to said first and second demodulation stages including modifying means proportioned to modify the amplitude of the demodulated color signals by respective predetermined ratios substantially equal to the cosine of their predetermined phase angle to the phase of the synchronizing subcarrier, means for detecting the adder-modified signals for an unbalanced signal determining a corresponding phase error in the locally-generated subcarrier signals relative to requisite synchronous demodulation operation of said demodulator stages, and reactance means in circuit with said oscillator responsive to the detected unbalanced signals for directly changing the phase of the locally-generated subcarrier signals and eliminate its said phase error; said adder circuit having first and second resistive branches; a first terminal of each of said branches being connected in common; the remaining terminals of said resistive branches being connected respectively, to the outputs of said first and second demodulator stages; the common terminal between said resistive branches being connected to said reactance means.

2. In a color television receiver synchronizing system as claimed in claim 1, said adder-modified signal-detecting means including a gate tube responsive to the adder circuit output for establishing the said unbalanced phase error signals solely during the associated color synchronization burst signalling time periods.

3. In a color television receiver synchronizing system as claimed in claim 1, said adder circuit including a variable resistance having first and second ends connected in series with said first and second branches for adjusting the stabilized phase relation of the generated subcarrier signals to be different from the normally requisite phase thereof.

References Cited in the file of this patent

UNITED STATES PATENTS 2,766,321 Parker ---------- Oct. 9, 1956
2,880,266 Parker ---------- Mar. 31, 1959